ary Examiner—Joseph F. Peters

United States Patent [19]
Moreman, III

[11] 4,046,434
[45] Sept. 6, 1977

[54] DEFORMABLE BEARING SEAT

[75] Inventor: Otis S. Moreman, III, Cincinnati, Ohio

[73] Assignee: The United States of America as represented by the Administrator of the National Aeronautics and Space Administration, Washington, D.C.

[21] Appl. No.: 595,747

[22] Filed: July 14, 1975

[51] Int. Cl.² .............................................. F16C 13/00
[52] U.S. Cl. ..................................... 308/195; 308/72; 290/52
[58] Field of Search ......................... 308/194, 72, 195; 290/52

[56] References Cited

U.S. PATENT DOCUMENTS

| 2,632,677 | 3/1953 | Potter | 308/194 |
|---|---|---|---|
| 2,975,007 | 3/1961 | Zwicker | 308/194 |
| 3,467,452 | 9/1969 | McElroy | 308/72 |

Primary Examiner—Joseph F. Peters
Assistant Examiner—Richard A. Bertsch
Attorney, Agent, or Firm—Norman T. Musial; Derek P. Lawrence; Henry J. Policinski

[57] ABSTRACT

A deformable bearing seat is provided for seating a bearing assembly in a housing. The seat includes a seating surface in the housing having a first predetermined spheroidal contour when the housing is in an undeformed mode. The seating surface is deformable to a second predetermined spherically contoured surface when the housing is in a deformed mode. The seat is particularly adaptable for application to a rotating blade and mounting ring assembly in a gas turbine engine.

5 Claims, 5 Drawing Figures

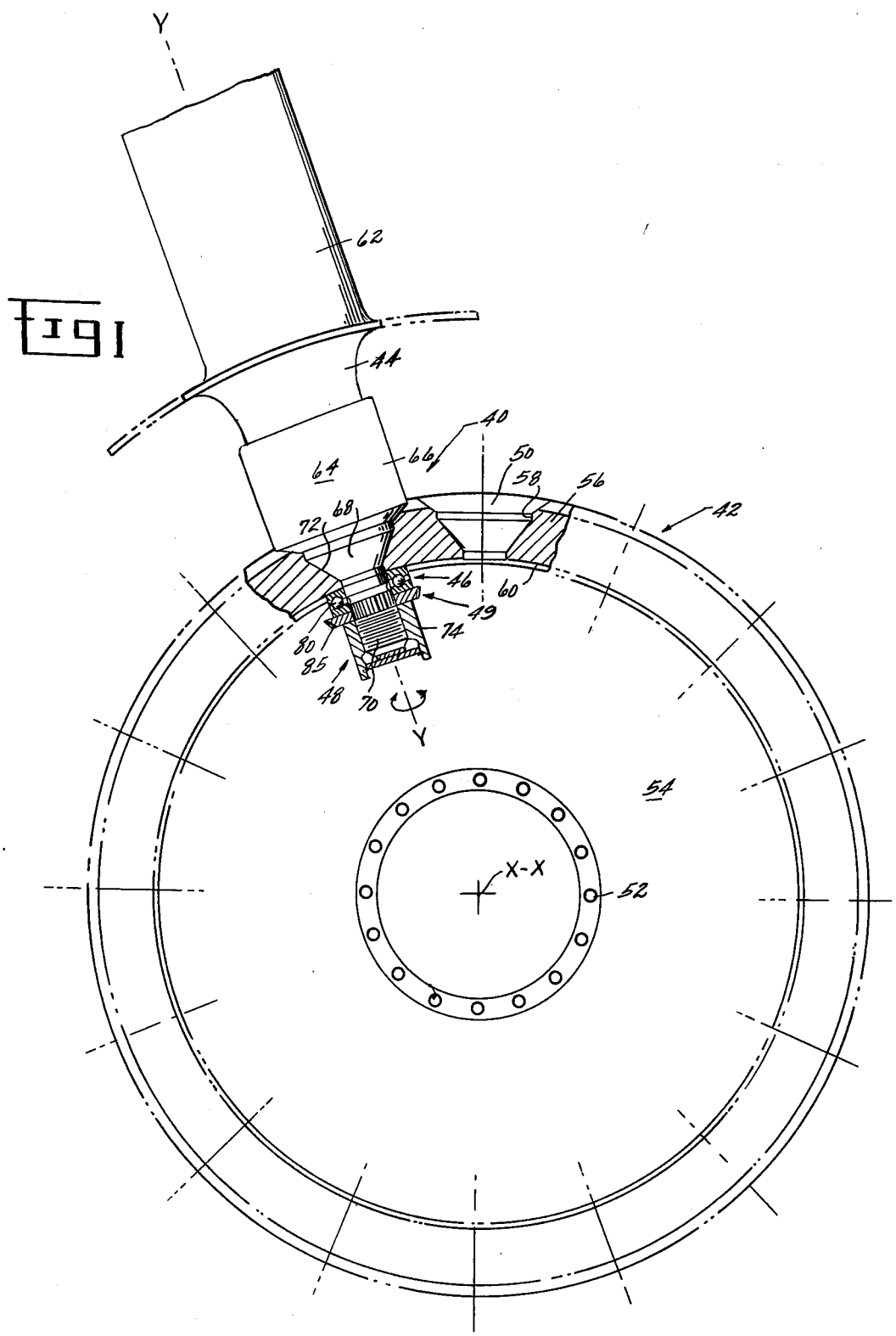

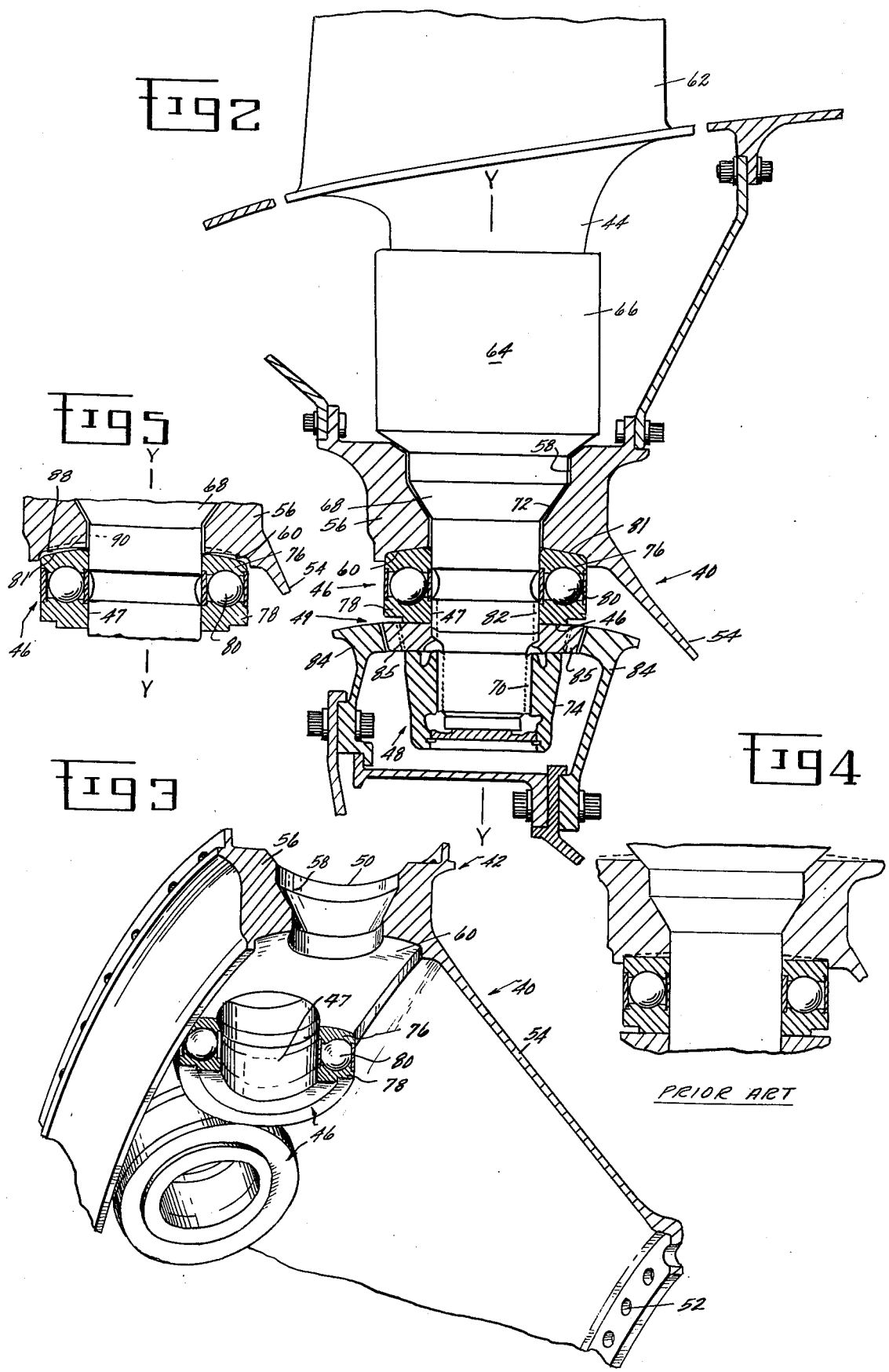

DEFORMABLE BEARING SEAT

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to bearing support means and, more particularly, to bearing support means for variable pitch fan blades associated with gas turbine engines.

Power plants recently developed for large aircraft have included gas turbine engines wherein a power turbine associated with the core engine drives a large diameter fan which provides propulsive thrust for the aircraft. While in the past such fans have generally utilized fan blades having a fixed pitch, more recently fan-type gas turbine engines have been provided with variable pitch fan blades to increase the operating efficiency of the engine over the entire range of the operating cycle.

In fan-type gas turbine engines, individual fan blades are secured to a disc attached to a shaft driven by a powered turbine such that both the disc and the fan blades rotate at high angular velocity about an axis comprising the centerline of the engine. In addition to the aforedescribed rotation, variable pitch fan blades are each rotatable about their own centerline to accommodate adjustments in blade pitch. Bearing assemblies and bearing seats used to support the fan blades for this latter rotation must be designed to function appropriately under high radial loads imposed by centrifugal forces associated with rotation about the engine centerline and yet must be compatible with weight and cost limitations of the engine.

Currently it is the practice of those skilled in the art to seat each individual bearing assembly in separate recesses machined into the fan disc. Since all radial loads due to the aforedescribed centrifugal force are ultimately transferred to the disc, deformation of the disc occurs causing distortion of the bearing seat such that, under operating conditions, the bearing assembly, since it is constrained to remain seated must also deform. Under operating conditions as improperly seated bearing assembly can result in excessive friction, heat generation, deterioration and premature failure of the bearing assembly. The present invention overcomes the aforestated problems associated with the current prior art practice by providing a substantially continuous seating surface which seats a plurality of bearings in a manner designed to abrogate the adverse effects of disc deformation due to centrifugal forces under operating conditions.

SUMMARY OF THE INVENTION

Accordingly, it is an object of the present invention to provide new and improved variable pitch fan assembly for a fan-type gas turbine engine.

It is a further object of the present invention to provide a new and improved bearing assembly and bearing seat which may be readily adaptable to the operational enviornment associated with variable pitch fans in gas turbine engines.

Briefly stated these and other objects of the present invention which will become apparent from the following detailed description and accompanying drawings are accomplished by the present invention which in one form provides a bearing seat for seating a bearing assembly in a housing wherein the seat comprises a deformable seating surface having a first predetermined contour for engaging a first portion of the bearing assembly when the housing is in an undeformed mode. The seating surface is deformable to a second predetermined contour for engaging a second portion of the bearing assembly when the housing is in a deformed mode. In the preferred embodiment of the invention the second predetermined contour is identical to the contour of a surface on the outer race of the bearing assembly. The first predetermined contour may be spheroidal and the seat may deform such that the second predetermined contour is sperical whereby the deformed seating surface may engage a surface of sperical contour on the outer race of the bearing assembly.

DESCRIPTION OF THE DRAWINGS

While the specification concludes with claims particularly pointing out and distinctly claiming the subject matter which is regarded as part of the present invention, the invention will be more fully understood from the following description of the preferred embodiments which are given by way of example with the accompanying drawings wherein:

FIG. 1 is a front schematic view of the fan disc in the deformed mode with one fan blade shown in its mounting environment in the disc flange and the position of the other fan blades indicated by centerlines;

FIG, 2 is a side view depicting a fan disc in the deformed mode with a rotatable fan blade mounted therein in accordance with the present invention;

FIG. 3 is a perspective view of a segment of the fan disc depicting the bearing assemblies and the bearing seat arrangement of the present invention;

FIG. 4 is an isolated view of a fan disc with a fan blade mounted therein in accordance with the present state of the art; and FIG. 5 is an isolated view of a fan disc in the undeformed mode with a rotatable fan blade mounted therein in accordance with the present invention.

DESCRIPTION OF THE PREFERRED EMBODIMENT

Referring to the drawings it is readily apparent that typical assemblies and subassemblies of a gas turbine engine are not shown therein. It is generally well known in the art that a typical gas turbine front fan engine is comprised of a fan assembly positioned forward of a core engine, the latter including in serial flow relationship a compressor, a combustor, a high pressure turbine adapted to drive the compressor, a low pressure turbine adapted to drive the fan assembly, and a core engine nozzle. Air ingested into the compressor is compressed and discharged into a combustor wherein the air is mixed with fuel and burned. The high energy hot gases produced by burning the mixture emerge from the combustor and are directed through the high pressure turbine wherein energy is extracted to drive the compressor. The lower energy combustion gases are then directed through a low pressure turbine wherein additional energy is extracted to drive the fan assembly which operates to effect a propulsive force to power the aircraft. The hot gases are finally discharged through the core engine nozzle to provide an additional propulsive force.

While the present invention is well adapted for cooperation with the core engine described above, it is capable of application to any multibladed engine which might differ in some manner from the aforedescribed typical gas turbine engine. Directing attention to FIG. 1 a fan blade and disc assembly is shown generally at 40 with its constituent parts cooperating under operating conditions and is comprised of fan disc or housing 42, a plurality of fan blades 44 (only one of which is shown with the position of the others indicated by centerlines), a plurality of bearing assemblies 46, a plurality of blade retaining means 48 and a plurality of pinion gears 49. Each fan blade 44 is associated with one of a plurality of radially extending apertures 50 in fan disc 42 and is supported for rotation therein in a manner hereinafter to be described. Fan disc or housing 42 is secured to a drive shaft (not shown) by conventional means cooperating with mounting holes 52 whereby fan disc 42 is rotatably driven about a first axis X—X to provide propulsive power.

Fan disc or housing 42 has a conically shaped hub portion 54 with an axially and circumferentially extending annular mounting ring or flange 56 integrally connected thereto (both better observed in FIG. 3). While a fan disc is shown in FIG. 3, other means, such as a cylindrical drum, can be used as a carrier for fan blades 44 and the present invention is equally adaptable to such alternate structure. The aforementioned apertures 50 are disposed in flange 56 at equally spaced circumferential intervals. Each aperture 50 is shown to be comprised of a series of consecutively stepped diameter portions 58 arranged such that the diameter of the aperture 50 decreases in the radially inwardly direction. Flange 56 includes a radially inwardly facing, circumferentially and axially extending seating surface 60 upon which each individual bearing assembly associated with each fan blade 44 is seated. Seating surface 60 is substantially continuous around the inner periphery of flange 56, the only interruptions therein being apertures 50.

Each fan blade 44 incorporates an airfoil 62 with an shank 64 adapted to penetrate into and through one of the apertures 50 in fan disc 42. The shank 64 includes an enlarged generally cylindrical portion 66 and a smaller generally cylindrical portion 68. Threads 70 are formed in cylindrical portion 68 near its radial innermost end for purposes hereinafter to be described. Between enlarged cylindrical portion 66 and threads 70, cylindrical portion 68 is comprised of a series of stepped diameter segments 72 arranged such that diameter of cylindrical portion 68 decreases in the radially inwardly direction. Segments 72 are adapted to matingly engage stepped diameter portions 58 of aperture 50 thereby effecting support of blade 44 on fan disc 42.

Referring now to FIG. 2, which shows a blade and disc assembly with its constituent parts cooperating under operating conditions, fan blades 44 each extend into and through one of the plurality of apertures 50 such that enlarged cylindrical portion 66 is disposed radially outward of flange 56 and part of smaller cylindrical portion 68 is disposed radially inward of flange 56. Radially inwardly of flange 56, cylindrical portion 68 cooperates with bearing assembly 46, pinion gear 49 and nut 74 in such a manner so as to provide for retention of blade 44 in aperture 50 and rotation of blade 44 in aperture 50 during adjustments in pitch of airfoil 62. More specifically, bearing assembly 46, comprised of an annular radially outer race 76, an annular radially inner race 78 and bearing elements 80, circumscribes and engages cylindrical portion 68 of shank 64 which is received in a centrally located aperture 47 which extends through bearing assembly 46 and is coaxial with the Y—Y axis. Outer race 76 fits loosely around cylindrical portion 68 and has a radially outwardly facing surface 81 which is seated on seat surface 60 of flange 56. Inner race 78 and pinion gear 49 are each secured to cylindrical portion 68 by conventional splined attachment as shown at 82 such that while each is free to slide axially along cylindrical surface 68 in the direction of the Y—Y axis, each is constrained to rotate in unison with fan blade 44 about the Y—Y axis. Nut 74 is threaded onto threads 70 of cylindrical portion 68 and tightened until bearing assembly 46 and pinion gear 49 are securely trapped between nut 44 and surface 60. In this position surface 81 of bearing assembly 46 is held seated on surface 60 and stepped diameter segments 72 are held adjacent stepped diameter portions 58 of aperture 50. Drive gear assembly 84 engages pinion gear 49 in a conventional manner at 85 to effect rotation of pinion gear 49, inner race 78 and blade 44 about the Y—Y axis to achieve adjustments in pitch of airfoil 62.

As best observed in FIGS. 1 and 3, seat surface 60 extends 360 degrees around the inner periphery of flange 56. Seat surface 60 is adapted to engage each radially outwardly facing surface 81 on each outward bearing race 76 of bearing assemblies 46. Hence, one substantially continuous seat 60 extending 360° around the inner periphery of flange 56 is provided which seats the plurality of bearing assemblies 46.

FIG. 4 depicts a bearing and bearing seat assembly in accordance with the present state-of-the-art practice. Under operating conditions, that is when the gas turbine engine is providing thrust for the aircraft and the blade and disc assembly are rotating at high angular velocities, the blade is subjected to a centrifugal force acting in the radially outward direction as indicated by the arrow in FIG. 4. The centrifugal force is transferred from the blade through the bearing assembly to the disc causing the disc to deform as indicated by broken lines in FIG. 4. It is readily apparent that deformation of the disc causes deformation of the disc seating surface, and since the bearing race and seating surface remain matingly engaged, the bearing assembly is likewise distorted. Distortion of the bearing assembly causes the bearing loads to be absorbed by the bearing in an abnormal manner; that is in a manner for which they were not designed. Hence, bearing assembly distortion results in excessive friction, heat generation, deterioration and premature failure of the bearing assembly.

The present invention overcomes the aforestated deficiencies of the prior art devices by providing a bearing seat which accommodates deformation of the disc and yet does not result in deformation of the bearing assembly.

Referring to FIG. 5, an isolated view of the flange 56 of disc 42, reduced diameter portion 68 of blade shank 64 and bearing assembly 46 are depicted so as to shown the cooperation of those elements when the disc 42 is in an undeformed mode; that is, when the gas turbine engine is not in thrust producing operation. More specifically, seating surface 60 is machined to a first contour such that when mated with bearing assembly 46 an annular gap 88 is produced between seating surface 60 and radially outwardly facing surface 81 on outer race 76.

The height of annular gap 88 decreases in a direcion toward the Y—Y axis until eventually the seating surface 60 engages a first portion of surface 81 of outer race 76 in near proximity to centrally located aperture 47. Cooperating in this manner, bearing assembly 46 is only partially seated on seating surface 60 since only a portion of surface 81 of outer race 76 is in engagement with seating surface 60.

As stated above during thrust generating operation of the gas turbine engine, blade 44 is subjected to centrifugal forces which are transmitted through bearing assembly 46 to flange 56 to disc 42. The transmitted force causes a portion of flange 56 to enter a deformed mode wherein flange 56 deforms radially outward in the area immediately proximate aperture 50 such that seating surface 60 assumes the position indicated by broken line 90 in FIG. 5. Hence, under thrust generating operation seating surface 60 deforms to a second predetermined contour whereby surface 60 engages a substantial portion of or all of surface 81 on outer race 76. More specifically, seating surface 60 assumes a second predetermined contour which is substantially identical to the contour of surface 81. In the preferred embodiment of this invention the second contour is identical to the contour of surface 81 whereby surface 81 of outer race 76 will fully engage seating surface 60, as shown in FIGS. 1 and 2 which depict the elements in cooperation under operating conditions. Hence, with the present invention deformation of the flange 56, in passing from the undeformed mode to the deformed mode, results in substantially full seating of bearing assembly 46 and consequently the bearing loads are absorbed in the normal manner by the bearing assembly 46.

In the preferred embodiment of the present invention, it has been found to be particularly advantageous to fabricate seating surface 60 in flange 56 to a spheroidal first predetermined contour wherein the two focii of the spheroid are closely spaced to one another. When spheroidal seating surface 60 is disposed adjacent a bearing assembly having an outer race 76 with a radially outwardly facing surface 81 which exhibits a spherical contour, gap 88 is produced as shown in FIG. 5. In the deformed mode spheroidal seating surface 60 assumes a sperical second predetermined contour whereby seating surface 60 engages substantially all of spherical surface 81 on outer race 76 as shown in FIGS. 1 and 2. In the deformed mode the spherical second predetermined contour of seating surface 60 is substantially identical to the spherical contour on surface 81 of outer race 76.

While preferred embodiments of the present invention have been disclosed herein, those skilled in the art will appreciate that other forms of the invention are possible without departing from the scope of the invention as defined by the appended claims.

I claim:

1. A deformable bearing seat for seating a bearing assembly in a housing, said seat comprising:
    a deformable seating surface having a predetermined spheroidally contoured surface adapted to engage a first portion of said bearing assembly when said housing is in an undeformed mode, said seating surface deformable to a predetermined spherically contoured surface adapted to engage a second portion of said bearing assembly when said housing is in a deformed mode.

2. A bearing seat as set forth in claim 1 wherein said second portion includes said first portion.

3. In a housing having at least one bearing assembly, the combination comprising:
    a deformable seating surface in said housing having a predetermined spheroidally contoured surface when said housing is in an undeformed mode, said seating surface being deformable to a predetermined spherically contoured surface when said housing is in a deformed mode; and
    a bearing race in said bearing assembly, said bearing race having a first surface with a spherical contour substantially identical to said predetermined spherically contoured surface, said firs surface engaging said deformable seating surface when said housing is in said undeformed and deformed modes.

4. The invention as set forth in claim 3 wherein said predetermined spheroidally contoured surface engages a first portion of said first surface and said predetermined spherically contoured surface engages a second portion of said first surface.

5. In a thrust generating gas turbine engine having a blade and ring assembly mounted for rotation about a first axis, said assembly including a plurality of blades each rotatably secured to said ring for rotation about a second axis, a plurality of bearing assemblies each disposed adjacent one of said blades, means for securing said plurality of blades to said ring, the combination comprising:
    a deformable seating surface associated with one of said bearing assemblies, said seating surface having a first predetermined spheroidally contoured surface when said ring is in an undeformed mode; and
    a bearing race in at least one of said bearing assemblies, said race having a first surface engaging said deformable seating surface, said seating surface in engagement with a first portion of said first surface when said ring is in an undeformed mode, said seating surface deformable to a second predetermined spherically contoured surface when said ring is in said deformed mode, said spherically contoured surface engaging a second portion of said first surface.

* * * * *